No. 869,197. PATENTED OCT. 22, 1907.
L. PRIDEAUX.
DUST PROOF DUST PAN AND CRUMB TRAY.
APPLICATION FILED MAR. 25, 1904. RENEWED MAR. 21, 1907.
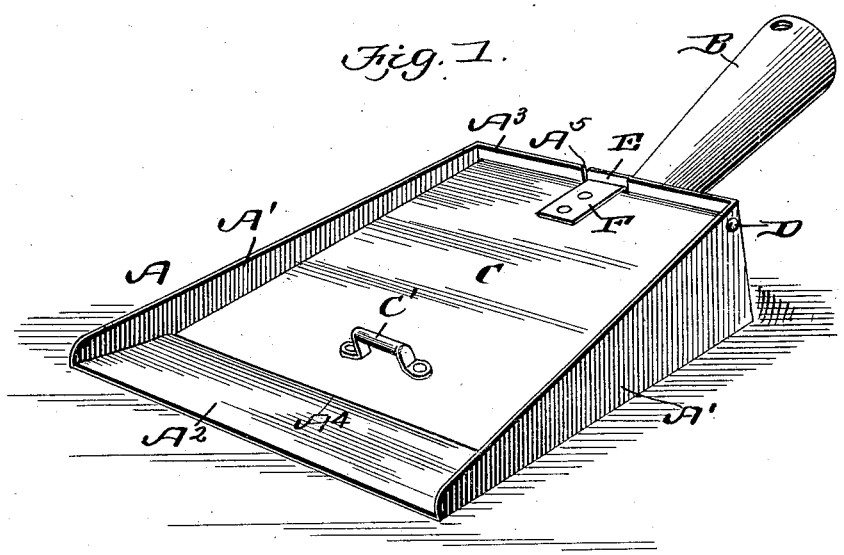
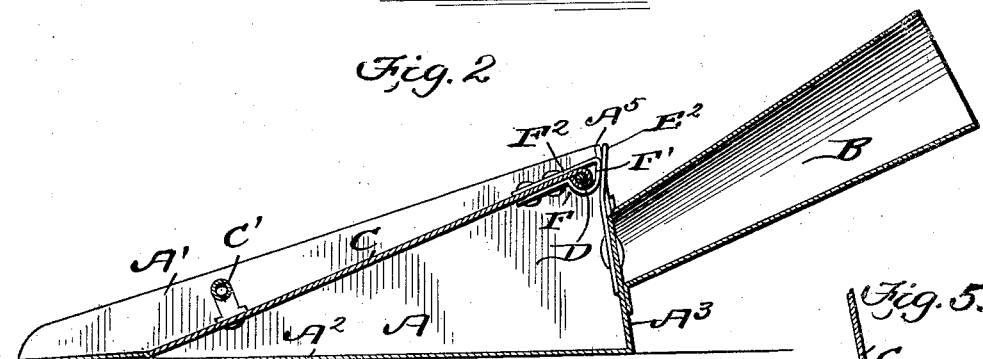
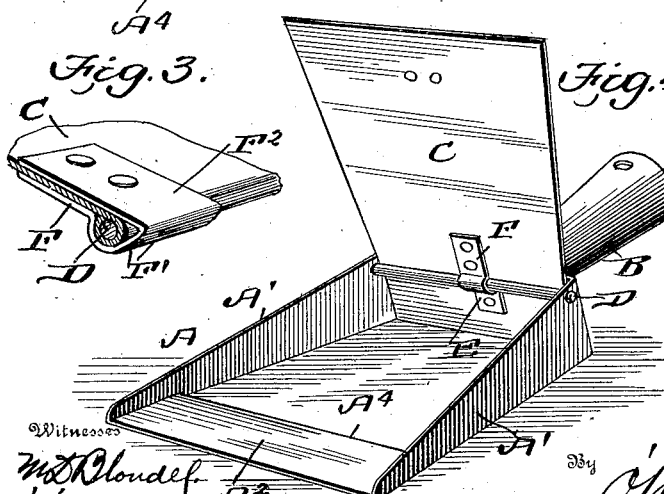
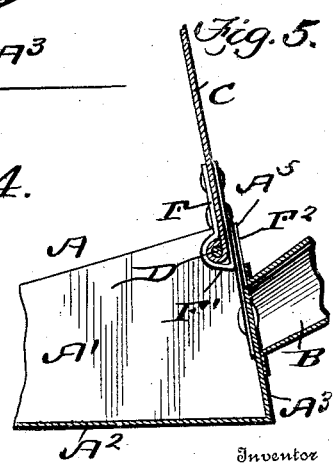
Inventor
L. Prideaux.
Witnesses
By
Attorneys
THE NORRIS PETERS CO., WASHINGTON, D. C.

UNITED STATES PATENT OFFICE.

LEWIS PRIDEAUX, OF PHILADELPHIA, PENNSYLVANIA, ASSIGNOR, BY DIRECT AND MESNE ASSIGNMENTS, OF ONE-THIRD TO AUGUST FERTIG AND ONE-THIRD TO CHARLES A. BLUMHARD, OF PHILADELPHIA, PENNSYLVANIA.

DUST-PROOF DUST-PAN AND CRUMB-TRAY.

No. 869,197.  Specification of Letters Patent.  Patented Oct. 22, 1907.

Application filed March 25, 1904. Serial No. 200,012. Renewed March 21, 1907. Serial No. 363,745.

*To all whom it may concern:*

Be it known that I, LEWIS PRIDEAUX, a citizen of the United States, residing at Philadelphia, in the State of Pennsylvania, have invented a new and useful Dust-Proof Dust-Pan and Crumb-Tray, of which the following is a specification.

This invention relates generally to dust pans, and more particularly to the peculiar construction and arrangement of the cover for such pans, the object being to provide a cover which can be held in a completely opened position while dust and dirt are being swept into said pan, and firmly closed afterwards so that the pan can be easily carried about without spilling the contents.

The invention consists in certain details of construction, hereinafter fully described, and pointed out in the claims.

In the drawings forming a part of this specification: Figure 1 is a perspective view of a dust pan provided with my improvement, the cover being closed. Fig. 2 is a longitudinal sectional view of the same. Fig. 3 is a detail perspective view illustrating the finger, carried by the cover. Fig. 4 is a perspective view of the pan showing the cover open, and Fig. 5 is a detail sectional view of the rear end of the pan, and cover in the opened position.

In carrying out my invention I employ a pan A, which is made of sheet metal as usual, and comprises the sides A', bottom A², and rear end A³, the sides being made tapering, as shown, and in practice I prefer to make the pan wider at the forward end than the rear end. A handle B, is attached to the rear end of the pan, and a pole or stick can be connected to this handle if so desired.

C, indicates the cover, which is pivoted between the sides at their upper, rear ends, a pivot rod D, to which the rear end of the cover is connected, being journaled in the said sides. The free end of the cover rests upon the bottom of the pan, when closed, and I prefer to construct the said bottom with a transverse upset portion A⁴, behind which the free end of the cover is adaptde to fit, as most clearly shown in Fig. 2. A suitable handle, C', is attached to the cover by means of which it can be conveniently raised when desired.

For the purpose of holding the cover in a raised position, while the pan is in use I employ a flat spring E, which is connected to the rear end of the pan, upon the inner face, and projects upwardly so that the free end of said spring rests in the cut out portion A⁵, produced in the rear end of the pan. A finger F, connected to the rear end of the cover, engages the free end of the plate E, said finger being in the form of a cam, as most clearly shown in Figs. 2 and 5, the face F', engaging the end of the spring when the cover is in a closed position, and the face F², engages the said spring when the cover is in an open position. This finger F, is preferably constructed from a strip of metal bent centrally upon itself, but it is obvious that it could be constructed in other ways. It will also be understood that the rear of the pan could be made of spring metal and the spring tongue could then be punched directly from the said rear end, thereby avoiding the separate spring E. In general use, however, the flat spring will be riveted to the end of the pan, and by having this spring quite strong the cover will be securely held in either an open or closed position.

Having thus fully described my invention, what I claim as new and desire to secure by Letters Patent is:—

In a dust pan having a bottom, sides, and a rear wall, a cover pivoted to the sides near the top of said rear wall, said rear wall having a notch in its top edge, a flat spring secured to said wall at one end, the free end thereof extending into said notch, a flat faced angular finger piece rigidly secured to the rear edge of said cover and extending into said notch, and engaging against said spring, two faces of said finger piece being so positioned with respect to the cover and spring that the spring rests on the one or the other of said faces to hold the cover in either open or closed position, respectively, substantially as described.

LEWIS PRIDEAUX.

Witnesses:
  WM. E. ULERY,
  JOHN BAXTER.